Aug. 30, 1927.
E. A. MOUTIER
1,641,092
BRAKE FOR RAILWAY TRAINS
Filed June 22, 1925 4 Sheets-Sheet 1
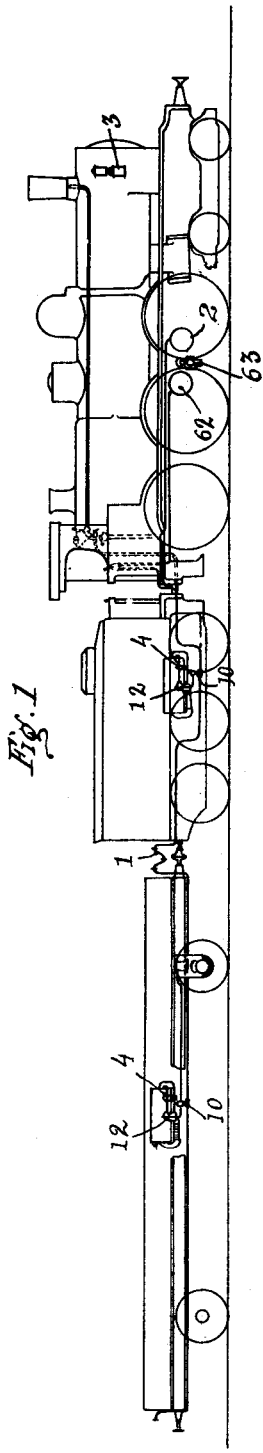
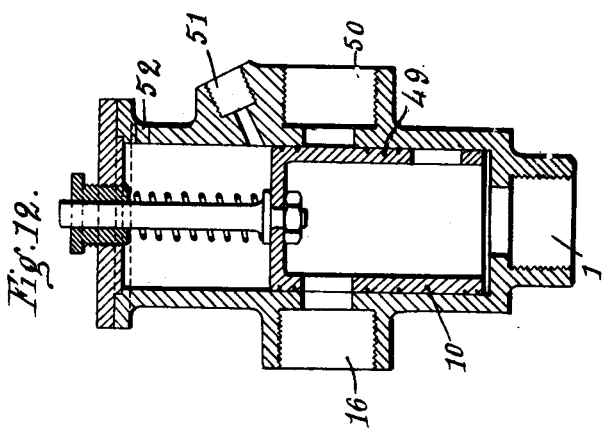
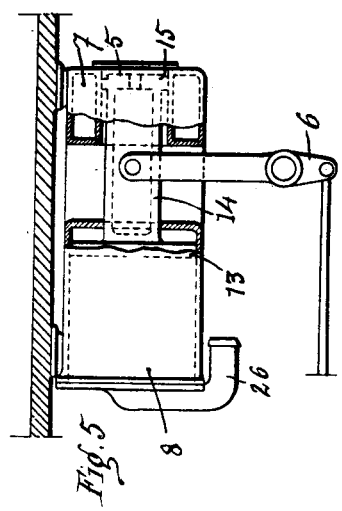
Inventor,
Ernest A. Moutier,
By Hanworth
Atty.

Aug. 30, 1927.

E. A. MOUTIER 1,641,092

BRAKE FOR RAILWAY TRAINS

Filed June 22, 1925    4 Sheets-Sheet 2

Inventor,
Ernest A. Moutier,
By Henry Orth Jr
Atty

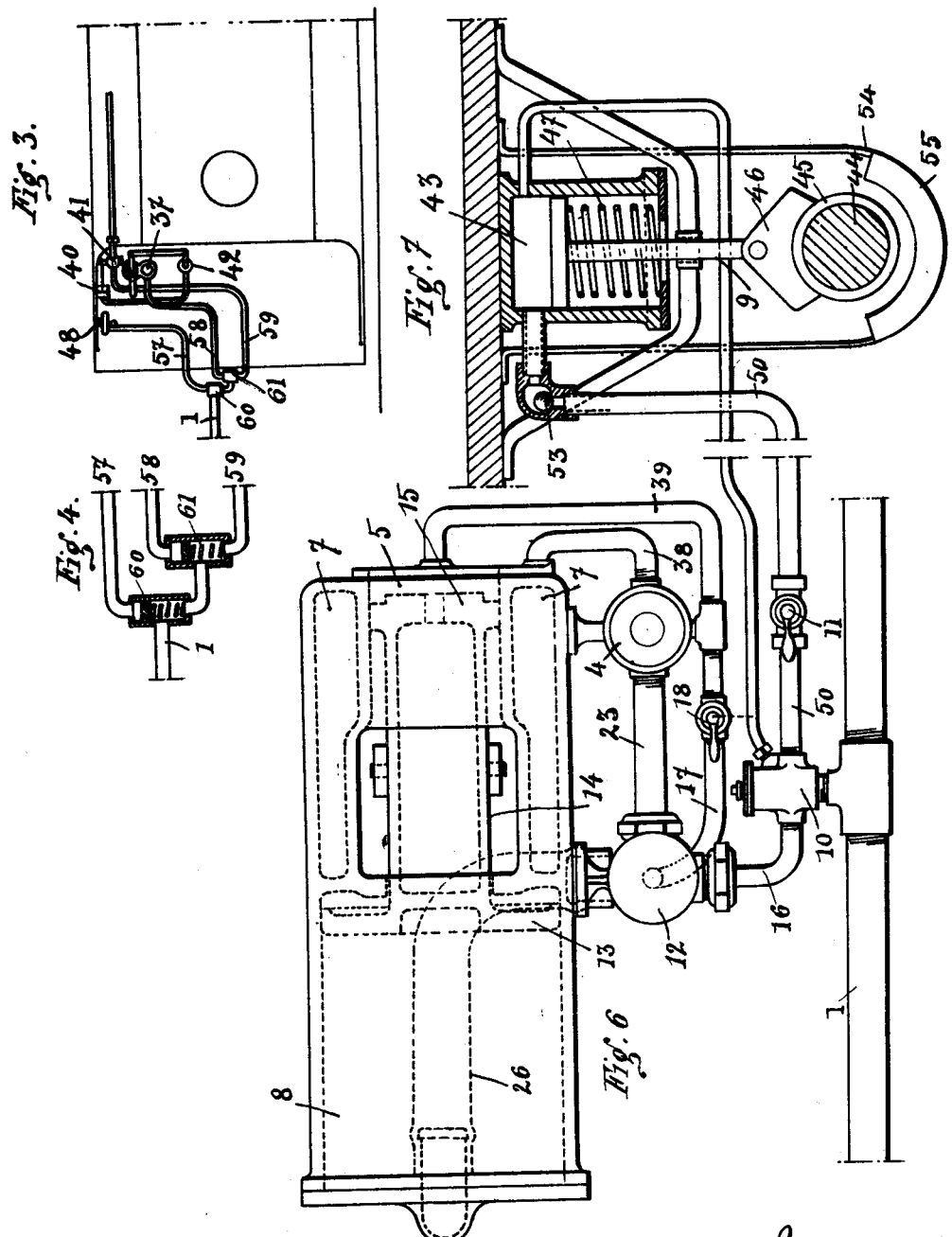

Aug. 30, 1927.
E. A. MOUTIER
BRAKE FOR RAILWAY TRAINS
Filed June 22, 1925
1,641,092
4 Sheets-Sheet 4
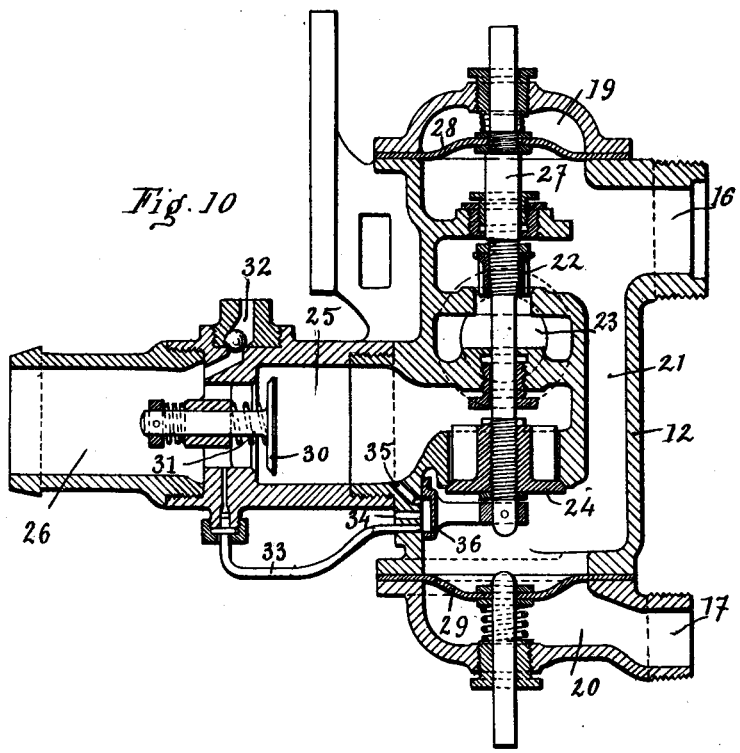
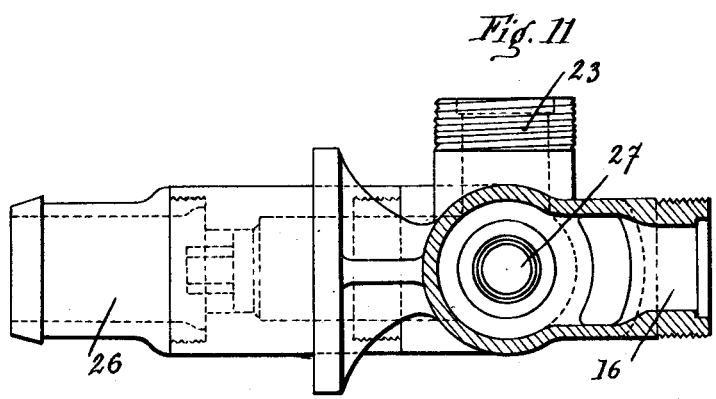
Inventor,
Ernest A. Moutier,
By
att.

Patented Aug. 30, 1927.

1,641,092

UNITED STATES PATENT OFFICE.

ERNEST ALBERT MOUTIER, OF PARIS, FRANCE.

BRAKE FOR RAILWAY TRAINS.

Application filed June 22, 1925, Serial No. 38,764, and in Austria July 18, 1924.

My invention has for its object an improved braking system which comprises a single conduit extending throughout the length of the train and which may utilize the whole range of pneumatic pressures from 0 atmosphere to 10 atmospheres and above.

My said system corresponds to all the desired conditions of automatic action, gradual braking and release, proper proportions between the brake pressure and the load of the wagon, either as a definitely adjusted arrangement or as an automatic system, as may be desired.

All the elements of the brake may be employed separately, or a certain number may be employed in combination, with the known types of brakes, in order to improve their operating conditions.

My said braking system comprises a main portion which may be termed the normal or standard brake, and which is in fact an automatic brake of the compressed air type, with which is combined an infra-brake functioning at low pressure in the neighbourhood of 0 kgs. per sq. cm. and a super-brake acting upon a pressure of 7 to 10 kgs. and above the greatest pressure in general use in the compressed air brakes, for example, the Westinghouse air brake.

The following description with reference to the appended drawings which are given by way of example set forth the braking system, the object of the invention.

Fig. 1 is a general view of a locomotive, of its tender, and of a wagon, showing the general arrangement.

Figs. 2 and 3 are respectively a front and a top view of the engine driver's cabin with the arrangement of the tubular conduits and the cocks of the combination brake.

Fig. 4 shows a special double valve for distributing purposes, mounted on the locomotive.

Fig. 5 is a front view of the motor system constituting the infra-brake and the normal brake actuating the rod and link gear, said motor system being suspended from the frame of the wagon.

Fig. 6 shows the same motor system on a larger scale viewed from the top, with the piping and connections.

Fig. 7 shows the arrangement of the super-brake which is secured to the frame of the wagon above one of the axles (viewed in a direction parallel to the axis of the vehicle axle).

Fig. 10 is a lengthwise section of the selector device permitting the successive or simultaneous action of pressures below or above one atmosphere.

Fig. 11 is a transverse section of the said selector adjacent the tubular portion of the general conduit.

Fig. 12 is a transverse section of a transposition valve permitting action upon the super-brake when there is sent into the general conduit a pressure above what is required for the standard brake.

Figure 2:
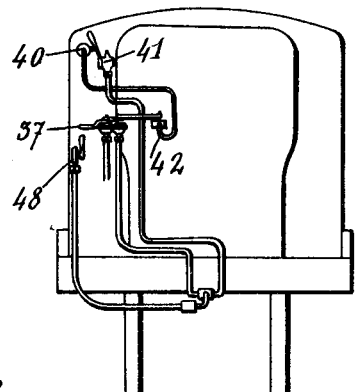

The standard brake consists of a compressed air brake of the Westinghouse type (in which there is disposed) along the whole length of the train a general conduit 1 connected with a compressed air cylinder termed the mean pressure cylinder 2 which is supplied, upon the engine, by an air pump 3, and comprises below each vehicle a three-way cock 4, a brake cylinder 5 controlling the rod and link gear 6, and an intermediate recipient 7 (Figs. 5, 6).

Figure 8:
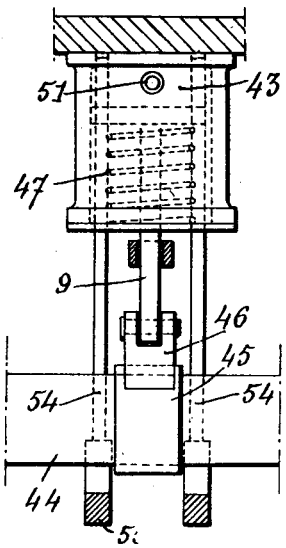
Fig. 8 is a view, parallel with the axle, of the said super-brake.

To the said standard brake is added on the one hand an "infra-brake" 8 which is so designated because it utilizes pressures below atmospheric pressure, and on the other hand a "super brake" 9 (Figs. 7 and 8) so called because it operates under higher pressures than those employed for the usual compressed air brakes.

For the sake of clearness in the description, I will temporarily set aside the said super-brake, supposing that the changing cock 10 (Fig. 6) is inoperative, and by cutting off the same by the closing cock 11 which is mounted upon its conduit in order to place it out of the circuit when desired.

The standard brake is combined with the infra-brake by the selector 12 (Fig. 6), and this latter brake 8 consists of a vacuum cylinder whereof the piston 13 is mounted in tandem upon a common rod 14 upon which is mounted the piston 15 of the compressed air cylinder 5 whereby the two pistons act in conjunction; the connection 6 for the rod and link gear of the brake shoes is common to both cylinders.

On the main conduit 1 is disposed the connecting cock 10; in normal conditions, the super-brake being inoperative (Fig. 12), the said cock communicates through 16 with the selector 12 (Fig. 6) which may be further connected with the compressed air brake cylinder by a conduit 17 which may be cut off by a three-way cock 18.

In the selector are comprised three chambers (Fig. 10) an upper chamber 19 and a lower chamber 20, whereof each is of the movable diaphragm type with reaction springs, and a partitioned central chamber 21 containing two cocks whereof one 22 serves to connect—through 16—the main conduit with the conduit 23 of the three-way cock 4 of the standard compressed air brake; and the other 24 connects—through 16—the main conduit with the chamber 25 communicating with the conduit 26 proceeding to the vacuum cylinder of the infra-brake.

The two valves 22 and 24 of the central chamber of the selector 12 are mounted on the common rod 27, and the whole arrangement is secured to the diaphragm 28 of the upper chamber 19, the same being situated opposite the diaphragm 29 of the lower chamber 20.

In the chamber 25 is disposed a check valve 30 which is held normally open by a return spring 31; forwardly of said valve is disposed the nozzle of the conduit 26 leading to the vacuum cylinder 8.

The conduit 26 communicates with an exhaust recipient provided with a spherical clack valve 32 which prevents all permanent pressure above atmospheric pressure in the vacuum cylinder, and said conduit further communicates with a conduit 33 which communicates with the chamber 21 under an atmospheric outlet 34. A conduit 35 which may connect together the chambers 25 and 21, in one position of valve 36 and to vent chamber 25 to the atmosphere in another position of said valve. The three conduits 33, 34 and 35 are situated opposite the slide valve 36 which is controlled by the valve 24, or what is the same, by means of a device mounted upon the rod 27 of the central mechanism of the selector.

It is herein supposed that the standard air brake is set for usual action and that the three-way cock 18 is closed and thus cuts off the part of the conduit 17 adjacent the triple valve 4 while on the contrary it affords an exhaust outlet for the part of the said conduit which communicates through 17 with the portion of the chamber 20 situated below the diaphragm 29.

The pressure produced by the engine driver's three-way cock 37 (Fig. 2) in the main conduit 1 is some 4 kilogs. per sq. cm. This pressure prevails in the inlet chamber 21 of the selector 12; the upper diaphragm 28 compresses its reaction spring; the device 27 is raised and with it the two valves 22 and 24 secured thereto, i. e. the air passes from the main conduit through 23 to the triple valve 4 and to the intermediate recipient 7 of the standard brake; the whole takes place as if nothing had been changed in the usual brake. The lower valve 24 tightly closes the connection between 25 and the vacuum cylinder.

When the brakes are thrown, thus reducing the pressure in the main conduit, the diaphragm 28 of the upper chamber 19 will descend together with the device 27 of the valves 22 and 24 which first passes through an intermediate position in which the valve 22—giving access through 23 to the triple valve—and the valve 24—giving access to the vacuum cylinder—will be both open, i. e. at the same time: (a) the compressed air expanded to 2 kilogs. pressure, for instance, proceeds through 23 in order to act upon the triple valve so as to place the intermediate recipient 7 in communication (through 38, 4 and 39) with the chamber 5 of the compressed air cylinder; and the piston 15 thus actuates the brake shoes through the rod and link gear 6; (b) a part of this air at 2 kilogs. pressure will enter through 24 into the chamber 25 preceding the vacuum chamber wherein it will at once drive the valve 30 upon its seat, thus cutting off connection with 26.

This action is advantageous inasmuch as it obviates all abrupt motion when throwing the brake, but it chiefly effects a sudden drop in pressure in the main conduit, precipitating the action of the triple valve from one of the following vehicles, and so on, from one vehicle to the other, the action upon the last vehicle being thus obtained in a much shorter time than in the known arrangements.

As the central mechanism 27 of the selector continues to descend, the valve 22 comes upon its seat and the communication 16 of the main conduit with the triple valve is entirely cut off through 23, the brake remaining constantly in action. The communication of the main conduit continues on the contrary to be established through 24 on the side of the vacuum as far as 26, at which the pressure (which is always above 1 kilog.) stops at the valve 30 of the conduit 26 of the vacuum cylinder.

The counter-pressure air in the vacuum cylinder is made to communicate with the exhaust through 33 and 34, and this air will flow gradually into the atmosphere through the valve box 32; the pressure of the brake shoes under the action of the compressed air piston now increases. During this time the slide valve 36 has descended to the limit of its down stroke; it closes the exhaust conduit 34 by means of its lower edge, also cutting off by means of its shell the conduit 33 and on the contrary opening the conduit 35 which establishes a second connection between 21 and 26.

At this time the infra-brake may intervene, it being superposed upon the standard brake. In fact, if by the use of the engine driver's valve 40 (Fig. 3) the vacuum is produced in the main conduit by connecting it with a vacuum pump or an ejector 41 actuated by a servo-motor 42, a vacuum will be produced in the chamber 21 of the selector 12 of each vehicle, then through 24 as far as the chamber 23, and since the valve 30 is actuated, the vacuum will proceed through 26 to the vacuum cylinder 8 of the wagon; (the spherical valve 32 is drawn upon its seat, thus closing the exhaust) the piston 13 of the brake cylinder is attracted by reason of the vacuum produced in the cylinder 8, thereby much increasing the traction on the rod 14 of the vehicle gear and hence the pressure upon the brake shoes. If the cross section of the vacuum cylinder is much greater than that of the compressed air cylinder, this pressure may increase in the ratio of 1 up to 2.

As it is not always desirable to augment the braking of certain wagons, and chiefly of those having a small load and in the empty state, the double braking action may be prevented and this is precisely the object of the conduit 17 which connects the lower chamber 20, provided with the diaphragm 29, of the selector 12—through 17—with the outlet of the triple valve, leading to the brake cylinder, i. e. at a point at which the pressure is precisely that of the cylinder of the standard air brake and at which there will prevail precisely a positive pressure if the standard brake operates and on the contrary the atmospheric pressure, if this brake does not operate and is connected with the discharge.

If the cock 18 upon this conduit 17 establishes the continuity of the said conduit, as soon as the standard brake acts, the pressure proceeding through the triple valve to the intermediate recipient 7 of the cylinder of the compressed air brake 5 will also proceed into the lower chamber 20 containing the diaphragm 29 of the selector 12, the diaphragm will rise and abut rod 27 of the device actuating the valves 22 and 24 and will prevent it from descending leaving solely in operation the standard compressed air brake without the aid of the vacuum brake or infra-brake which will not come into action, even when the general conduit operates on a vacuum.

If on the contrary for any reason such as leakage or other, the standard brake will not operate, there will be no pressure in the lower chamber 20 of the selector; the functioning of the infra-brake by the vacuum will not be prevented, so that braking will take place. In no case will there be a double braking, if it is desired to thus prevent the same.

But if as was stated at the beginning, one turns the arresting cock 18 in the conduit 17 so as to cut off all connection, the two brakes, i. e. the standard brake and the infra-brake may always operate simultaneously.

In consequence, for the light wagons circulating empty, it will suffice to turn the cock 18 into the position in which it affords the continuity of the conduit, in order to avoid having an excessive braking, while on the contrary, for a loaded wagon, one will turn the said arresting cock so as to close the said conduit so that both brakes, i. e. the standard brake and the infra-brake, can operate simultaneously.

For the brake release, the engine driver closes the vacuum cock 40, and sends—through the cock 37 of the standard brake—the compressed air from mean pressure tank 2 into the general conduit. This air enters at 16 into the central chamber 21 of the selector 12 of each wagon, and encounters the upper valve 22 which is closed and the lower valve 24 which is open: it thus attains the valve 30 at which it stops, since it drives the valve upon its seat. At this moment, the piston rod which is common to the compressed air cylinder and the vacuum cylinder will continue to actuate the rod and link gear.

But on the other hand, the diaphragm 28 which separates the chamber 21 from the chamber 19 will rise, lifting the rod 27 which closes the valve 24, opening on the contrary the valve 22 to permit the pressure in the general conduit to proceed to actuate the triple valve, and to fill the intermediate compressed air tank and also to place the corresponding power cylinder in the discharge position.

The valve 24 has now closed, and with it the slide valve 36 has ascended, and it then places in communication (through 33, 34) with the atmosphere the conduit 26 coming from the vacuum cylinder 8. The air enters the vacuum cylinder 8 of the infra-brake, and the action on the common piston rod 4, actuating the rod and link gear 6, now ceases. The double brake ceases to act altogether, and there will be a progressive effect in this braking. The normal condition is now obtained.

It should be noted that the infra-brake of the vacuum type constitutes a direct brake which is not likely to become exhausted when upon long gradients, since one may continually supply it and control its power, at will.

Figure 9:
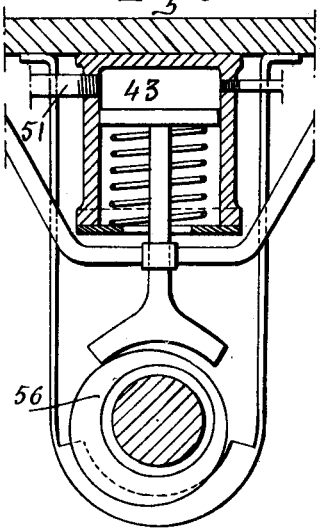
Fig. 9 is a modification of the super-brake, viewed in a direction parallel to the axis of the vehicle axle, and comprising the device permitting to still further augment the degree of braking according to the weight of the wagon.

Precisely, as concerns the steep gradients, one may bring into action the super brake, which is also modifiable and cannot be exhausted. This is composed, for each vehicle, of an air cylinder 43 (Figs. 7 to 9) disposed above a vehicle axle 44 to which is keyed a pulley 45 of a certain diameter. The piston 9 of the cylinder terminates in a friction shoe 46 which is maintained raised at some distance from the pulley, by a reaction spring 47, but which may bear upon it for braking purposes when it is impelled by the compressed air entering the cylinder 43.

The air enters the cylinder 43 through a transposition valve 10 (Fig. 12) when the pressure produced in the general conduit by the mechanism—by means of a cock 48 distinct from the normal cock 37 (Figs. 2 and 3)—considerably exceeds that which corresponds to the functioning of the standard brake (some 4 kgs.), i. e. a pressure of 7 to 10 kgs. for example; such a pressure will in fact raise the lower cylindrical slide valve 49 of the transposition valve which cuts off the communication with the triple valve of the standard brake by way of 16 and on the contrary delivers air at high pressure into the cylinder of the super-brake which it placed (when in the inoperative position) on the exhaust by way of example of 52 and 51.

The compressed air at high pressure thus enters the cylinder 43 of the super-brake through a spherical valve box 53 which permits the entrance of air to the cylinder but not the return in the opposite direction. It will follow that the cylinder might tend to slightly raise the body of the wagon, and for this reason I surround the axle with two protecting straps 54 each of which comprises another brake shoe 55 at its lower part, so as to act if the aforesaid effect should be produced, and at all events, to limit the amount of the displacement. This tendency to lifting is not an inconvenience, but a most valuable advantage, since it serves to increase the braking effect according to the weight of the vehicle. In order to utilize precisely its maximum effect for this purpose, I mount upon the vehicle axle, not a disk, but an eccentric member 56, in such manner that at each revolution of the wheel, the air under pressure contained in the cylinder and forming an air cushion shall be compressed by the movement of the said axle at the time when the piston rises under the action of the eccentric and is thus given, at various instants, at each revolution of the wheel, an excess of pressure which depends upon the weight of the body of the wagon, slightly raised, and which will proportionally augment the braking.

When it is desired to eliminate the action of the super-brake it will suffice that the engine driver shall cut out the control cock 48; the transposition valve 10 will then act, reopening the communication with the selector for the functioning at the pressure of the standard brake, and at the same time the super-brake will return to the exhaust position by way of the conduit 51.

It should be observed that for the functioning of all the parts of the said integral brake, there is mounted upon each vehicle of the entire train, but a single general conduit which communicates with the engine driver's cocks, or with a single cock which instead of producing only the various pressures pertaining to the standard automatic compressed air brake, will have two additional positions—one connects the general conduit with a vacuum pump or an ejector which a servo-motor may actuate for the functioning of the vacuum cylinder of the infra-brake, and the other provides a pressure above that of the normal brake, in order to actuate the super-brake.

The three conduits mounted on the locomotive (Fig. 3) 57 for high pressure; 58 for mean pressure; 59 for pressures below 1 atmosphere, communicate with the single conduit 1 extending throughout the whole train, through a double distributing valve whose function is self-evident and which may have widely varying dispositions.

The high pressure of the super-brake is supplied by a second compressed air tank 62 (at a pressure of over 7 kgs.) mounted on the locomotive and distinct from the tank employed for the usual pressure (some 4 kgs.) which supplies the conduit for the functioning of the standard brake.

It is however not essential, for the compression of the air in the high pressure cylinder, to use a pump which is distinct from the pump which supplies the compressed air at some 4 kgs. for the low pressure cylinder. It will in fact be sufficient to supply the air from the pump only to the low pressure cylinder, and to unite the two cylinders by a known apparatus, termed pneumatic ram 63 (Fig. 1), so that when the low pressure cylinder is filled at its normal pressure, the said ram will act and will deliver the overflow of air into the high pressure cylinder, until the latter will be filled to the limit at its standard pressure which is higher than that of the other cylinder.

It will be understood that the infra-brake together with all of its parts may be adapted to continuous brakes in such manner as to offer an aggregate which is suitably protected by an envelope or casing.

To recapitulate, the advantages offered by the brake, the object of the invention, are as follows:

It permits to augment the braking, even to such a point as to double the same, while using but a single conduit along the train.

It provides for the automatic action which is necessary in the event of the rupture of a coupling, but it further comprises two direct brakes permitting compliance with the proper conditions for the descent upon the long gradients and providing for the abrupt and insantaneous stopping in the presence of an unexpected obstacle.

It ensures the progressive action of the braking and the release.

It offers a more rapid action upon the last wagons of the train.

It allows of proportioning, at will or automatically, the action of the brake upon each wagon to the weight of the vehicle.

Obviously, the apparatus, infra-brake and super-brake, with their elements, may be utilized separately and without reference to one another, for the improvements of the continuous brakes of the known types.

What I claim is:—

1. In an air-brake system, the combination with automatic brake actuating means operating at intermediate air pressures; of an infra-brake operating at pressures below atmospheric pressure, said infra-brake comprising for each railway car a cylinder and a piston to produce an action substantially as strong as that of said automatic brake, means for connecting the cylinder of said infra-brake to the air line of the train and also controlling the automatic brake to permit the infra-brake to be operated on vacuum in the air line of the train.

2. In an air brake system, the combination with an automatic air brake; of an infra-brake operating at pressures below atmospheric pressure and comprising a cylinder and a piston therein mechanically connected to said automatic brake, means connecting the cylinder of the infra-brake to the air line and controlling both brakes, the former for pressure and the latter for vacuum.

3. In an air-brake system the combination with an automatic air brake; of an infra-brake operating on vacuum and comprising a cylinder and a piston therein, mechanism connecting the two brakes to the air line, said mechanism operating to apply the automatic brake by pressure air and hold the pressure therein while the infra-brake is operated on vacuum, or to operate the infra-brake alone..

4. In an air brake system, the combination with an automatic air brake operating at mean pressures; of an infra-brake operating at pressures below atmospheric pressure and comprising a cylinder, and a piston mounted upon the piston rod of the automatic brake, means connecting the infra-brake with the air line to the automatic brake and a super air brake operating at pressures above those of the automatic brake, means connecting the super brake to the air line and a transposition valve included in the means connecting the automatic brake to the air line, said valve establishing communication with the super brake when the pressure in the air line increases.

5. In an air brake system, a main air brake and an infra-brake in combination with a selector comprising a chamber connected to the air line, a diaphragm-operated rod therein, two valves on said rod one controlling passage to the main brake and the other controlling the infra-brake, a balanced valve between the infra-brake and the valve controlling the infra-brake, a non-return valve to vent said infra-brake to the atmosphere, a slide valve on said rod and controlling passages between the front and rear of said balanced valve and said chamber and a vent passage to the atmosphere.

6. In an air brake system, a main air brake and an infra-brake in combination with a selector comprising a chamber connected to the air line, a diaphragm-operated rod therein, two valves on said rod, one controlling passage to the main brake and the other controlling the infra-brake, a balanced valve between the infra-brake and the valve controlling the infra-brake, a non-return valve to vent said infra-brake to the atmosphere, a slide valve on said rod and controlling passages between the front and rear of said balanced valve and said chamber and a vent passage to the atmosphere, a diaphragm arranged when actuated to prevent the operation of said rod, and subject on one face to air pressure of said chamber and on the other face to a pipe conducting air to said main brake, a three-way valve in said pipe to vent it to the atmosphere and when so vented will prevent the actuation of said diaphragm and permit said rod to operate, whereby both brakes operate, and when said three-way valve is closed will cause the holding of said rod and allow only the operation of the main brake.

7. In an air brake system, a main brake, an infra-brake operating at pressures below atmospheric pressure and producing substantially the same braking effect as the main brake, means for successively connecting said brakes to the air line under successive conditions of positive and negative pressures therein, and a super brake operating upon high pressures in the air line and comprising a cylinder connected to such line, a cock to cut off said super brake when desired, a piston and rod in said cylinder, a brake shoe on said rod, an excentric on a wheel axle with which said shoe cooperates and means to prevent the lifting of the car when said brake is applied.

8. In an automatic air brake system, a main brake operating upon mean pressure air, an infra-brake operating upon vacuum, means connecting the infra-brake to line, a selector in said means to cause first the operating of said main brake and thereafter said infra-brake when vacuum is sent to line.

9. In an automatic air brake system, a main brake operated by mean air pressure, an infra-brake operated by vacuum, means connecting both brakes to line, a selector to first set the main brake upon mean pressure in the line, to hold said pressure and set the infra-brake upon vacuum in the line, and a super brake connected to line and operating at high pressures, a transposition valve between the supra brake and selector to cut off communication with the latter and connect said super brake directly to line.

In testimony that I claim the foregoing as my invention, I have signed my name hereto.

ERNEST ALBERT MOUTIER.